(12) United States Patent
Bernal Zuñiga et al.

(10) Patent No.: US 11,724,634 B2
(45) Date of Patent: Aug. 15, 2023

(54) VEHICLE CARGO DIVIDER ASSEMBLY SYSTEM

(71) Applicant: Ford Global Technologies, LLC, Dearborn, MI (US)

(72) Inventors: Fabio Andres Bernal Zuñiga, San Mateo Atenco (MX); Mario Rosas Chávez, Azcapotzalco (MX); Carlos José Rodrigo Valero Reyes, Narvarte (MX)

(73) Assignee: Ford Global Technologies, LLC, Dearborn, MI (US)

( * ) Notice: Subject to any disclaimer, the term of this patent is extended or adjusted under 35 U.S.C. 154(b) by 269 days.

(21) Appl. No.: 17/102,783

(22) Filed: Nov. 24, 2020

(65) Prior Publication Data
US 2022/0161709 A1    May 26, 2022

(51) Int. Cl.
*B60P 7/14*    (2006.01)
*B60R 5/04*    (2006.01)

(52) U.S. Cl.
CPC . *B60P 7/14* (2013.01); *B60R 5/04* (2013.01)

(58) Field of Classification Search
CPC ................ B60P 7/14; B60R 5/04; B60R 7/02
USPC .... 410/118, 77, 94, 95, 121; 296/37.1, 37.8, 296/37.14, 37.16
See application file for complete search history.

(56) References Cited

U.S. PATENT DOCUMENTS

| | | | |
|---|---|---|---|
| 5,234,116 A | 8/1993 | Kristinsson et al. | |
| 6,015,071 A | 1/2000 | Adomeit et al. | |
| 6,056,177 A * | 5/2000 | Schneider | B60R 5/04 224/539 |
| 6,220,645 B1 * | 4/2001 | Jacquemin | B60R 13/0206 296/214 |
| 6,732,895 B2 | 5/2004 | Poliquin et al. | |
| 6,974,170 B2 | 12/2005 | Mulvihill | |
| 8,215,693 B2 | 7/2012 | Ulita | |
| 10,196,008 B2 | 2/2019 | Ranka et al. | |
| 10,207,648 B2 | 2/2019 | Loew et al. | |
| 10,676,005 B2 | 6/2020 | Schnur et al. | |
| 2005/0045682 A1 | 3/2005 | Tarrant et al. | |
| 2016/0144800 A1 * | 5/2016 | Henderson | B60R 13/013 296/24.4 |
| 2016/0152189 A1 | 6/2016 | Nedelman | |
| 2017/0129410 A1 | 5/2017 | Ito | |
| 2019/0071022 A1 * | 3/2019 | Barradas Guarneros | B60R 5/04 |

FOREIGN PATENT DOCUMENTS

EP    1321335 A1    6/2003

* cited by examiner

*Primary Examiner* — Paul N Dickson
*Assistant Examiner* — Sunsurraye Westbrook
(74) *Attorney, Agent, or Firm* — Vichit Chea; Price Heneveld LLP (57) ABSTRACT

An assembly for a vehicle includes a substrate that defines a channel that has a bottom, a retention feature that is coupled to the substrate and that extends into the channel, and a panel that is operably coupled to the retention feature. The panel is movable between a locked position, wherein the panel is maintained in an upright position by the retention feature, and an unlocked position, wherein the panel is operable to pivot relative to the retention feature between the upright position and a stowed position.

20 Claims, 11 Drawing Sheets

VEHICLE CARGO DIVIDER ASSEMBLY SYSTEM

FIELD OF THE DISCLOSURE

The present disclosure generally relates to an assembly for a vehicle. More specifically, the present disclosure generally relates to an assembly for a vehicle that includes a panel that is operable between a stowed position and an upright position.

BACKGROUND OF THE DISCLOSURE

Vehicles often include a cargo storage area. One or more panels that may be pivoted from stowed positions to upright positions to divide the cargo storage area into sections may be desired.

SUMMARY OF THE DISCLOSURE

According to a first aspect of the present disclosure, an assembly for a vehicle includes a substrate that defines a channel having a bottom, a retention feature coupled to the substrate and extending into the channel, and a panel operably coupled to the retention feature and movable between a locked position and an unlocked position. In the locked position, the panel is maintained in an upright position by the retention feature. In the unlocked position, the panel is operable to pivot relative to the retention feature between the upright position and a stowed position.

Embodiments of the first aspect of the present disclosure may include any one or a combination of the following features:
- the retention feature includes a locking portion positioned within the channel and having a protrusion and a receiving portion positioned outside of the channel and defining a receiver, wherein the panel is maintained in the upright position by the locking portion;
- the panel includes a foot, the foot is nearer than the protrusion to the bottom in the locked position, and the foot is further than the protrusion from the bottom in the unlocked position;
- the panel includes a pivot portion configured to be received within the receiver in the unlocked position, such that the panel is operable to pivot between the upright and stowed positions via rotation of the pivot portion within the receiver;
- the pivot portion is nearer than the protrusion to the bottom in the locked position, and the pivot portion is further than the protrusion from the bottom in the unlocked position;
- the substrate includes an upper surface, the panel includes a first side and a second side opposite the first side, the first side is substantially parallel to the upper surface in the stowed position of the panel, and the first side is substantially perpendicular to the upper surface in the upright position of the panel; and
- the second side is configured to contact the upper surface in the stowed position of the panel.

According to a second aspect of the present disclosure, a vehicle includes a rear cargo area. The vehicle also includes a substrate positioned within the rear cargo area and defining a channel having a bottom. The vehicle further includes a retention feature having a locking portion positioned within the channel and a receiving portion positioned outside the channel and defining a receiver. The vehicle also includes a panel having a pivot portion and a foot and being operable between a locked position and an unlocked position. In the locked position, the locking portion is engaged with the foot within the channel to maintain the panel in an upright position. In the unlocked position, the panel is operable to pivot between the upright position and a stowed position via rotation of the pivot portion within the receiver.

Embodiments of the second aspect of the present disclosure may include any one or a combination of the following features:
- the locking portion includes a protrusion within the channel and in a spaced relationship with the bottom;
- the foot is nearer than the protrusion to the bottom in the locked position, and the foot is further than the protrusion from the bottom in the unlocked position;
- the pivot portion is nearer than the protrusion to the bottom in the locked position, and the pivot portion is further than the protrusion from the bottom in the unlocked position;
- the substrate includes an upper surface, the panel includes a first side and a second side opposite the first side, the first side is substantially parallel to the upper surface in the stowed position of the panel, and the first side is substantially perpendicular to the upper surface in the upright position of the panel;
- the second side is configured to contact the upper surface in the stowed position of the panel; and
- the upper surface is substantially planar and faces vehicle-upward.

According to a third aspect of the present disclosure, an assembly for a vehicle includes a substrate defining at least one channel having a bottom. The assembly also includes at least one retention feature coupled to the substrate and extending into the at least one channel. The assembly also includes a first panel operably coupled to the at least one retention feature and movable between a first panel locked position and a first panel unlocked position. In the first panel locked position, the first panel is maintained in a first panel upright position by the at least one retention feature. In the first panel unlocked position, the first panel is operable to pivot relative to the at least one retention feature between the first panel upright position and a first panel stowed position. The assembly further includes a second panel operably coupled to the at least one retention feature and movable between a second panel locked position and a second panel unlocked position. In the second panel locked position, the second panel is maintained in a second panel upright position by the at least one retention feature. In the second panel unlocked position, the second panel is operable to pivot relative to the at least one retention feature between the second panel upright position and a second panel stowed position.

Embodiments of the third aspect of the present disclosure may include any one or a combination of the following features:
- the first panel is operable to pivot about a first pivot axis between the first panel upright position and the first panel stowed position, and the second panel is operable to pivot about a second pivot axis between the second panel upright position and the second panel stowed position, wherein the first pivot axis is substantially perpendicular to the second pivot axis;
- the first panel is operable to pivot about a first pivot axis between the first panel upright position and the first panel stowed position, and the second panel is operable to pivot about a second pivot axis between the second panel upright position and the second panel stowed position, wherein the first pivot axis is substantially parallel to the second pivot axis;

the at least one retention feature includes a locking portion positioned within the at least one channel and having a protrusion and a receiving portion positioned outside of the at least one channel and defining a receiver, wherein the first panel is maintained in the first panel upright position by the locking portion;

the first panel includes a foot, the foot is nearer than the protrusion to the bottom in the first panel locked position, and the foot is further than the protrusion from the bottom in the first panel unlocked position; and the first panel includes a pivot portion configured to be received within the receiver in the first panel unlocked position, such that the first panel is operable to pivot between the first panel upright position and the first panel stowed position via rotation of the pivot portion within the receiver.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Additional features and advantages of the present disclosure will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring now to FIGS. 1-12, an assembly 10 for a vehicle 12 includes a substrate 16. The substrate 16 defines a channel 28 having a bottom 30. A retention feature 40 is coupled to the substrate 16 and extends into the channel 28. A panel 58 is operably coupled to the retention feature 40 and is movable between a locked position, wherein the panel 58 is maintained in an upright position by the retention feature 40, and an unlocked position, wherein the panel 58 is operable to pivot relative to the retention feature 40 between the upright position and a stowed position.

Figure 1:
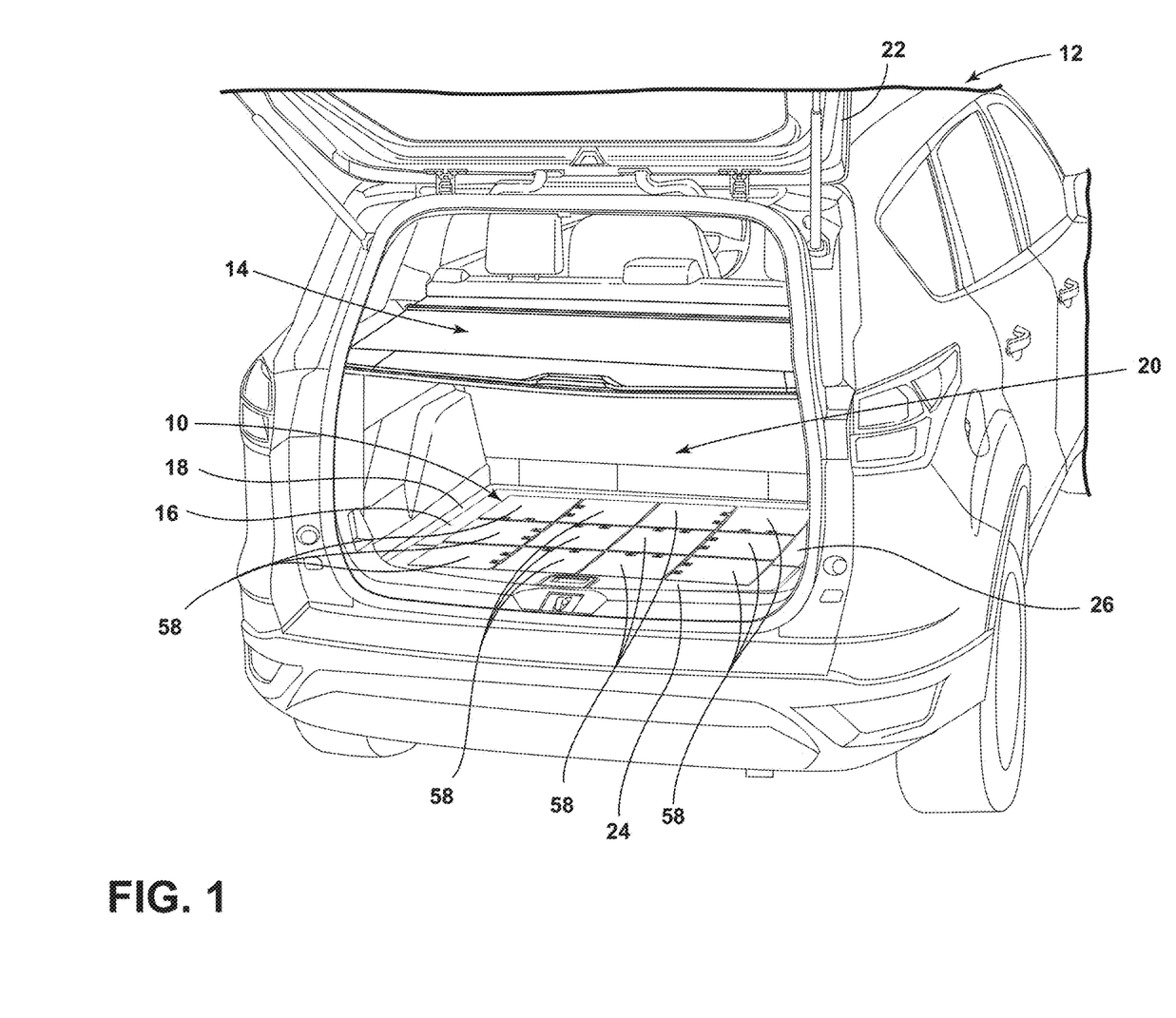
FIG. 1 is a rear perspective view of a vehicle, illustrating a plurality of panels disposed within a rear cargo area of the vehicle, according to one embodiment.

Referring now to FIG. 1, the vehicle 12 includes a vehicle interior 14. The vehicle interior 14 may include the substrate 16. In some implementations, the substrate 16 may be a floor 18 of the vehicle 12. In some embodiments, the substrate 16 may be a component of the vehicle 12 that is positioned proximate to and/or is coupled to the floor 18 of the vehicle 12. As illustrated in FIG. 1, the vehicle interior 14 includes a rear cargo area 20. The rear cargo area 20 may be accessed by a user by opening a cargo door 22 of the vehicle 12. In various embodiments, the substrate 16 may be positioned within the rear cargo area 20 of the vehicle 12. For example, in some embodiments, the substrate 16 may be the floor 18 of the rear cargo area 20 of the vehicle 12. In the embodiment illustrated in FIG. 1, the substrate 16 is a locker door 24 that conceals and provides access to a storage locker positioned vehicle-downward of the locker door 24 in the rear cargo area 20. A variety of types of substrates 16 within the vehicle interior 14 are contemplated.

Figure 2:
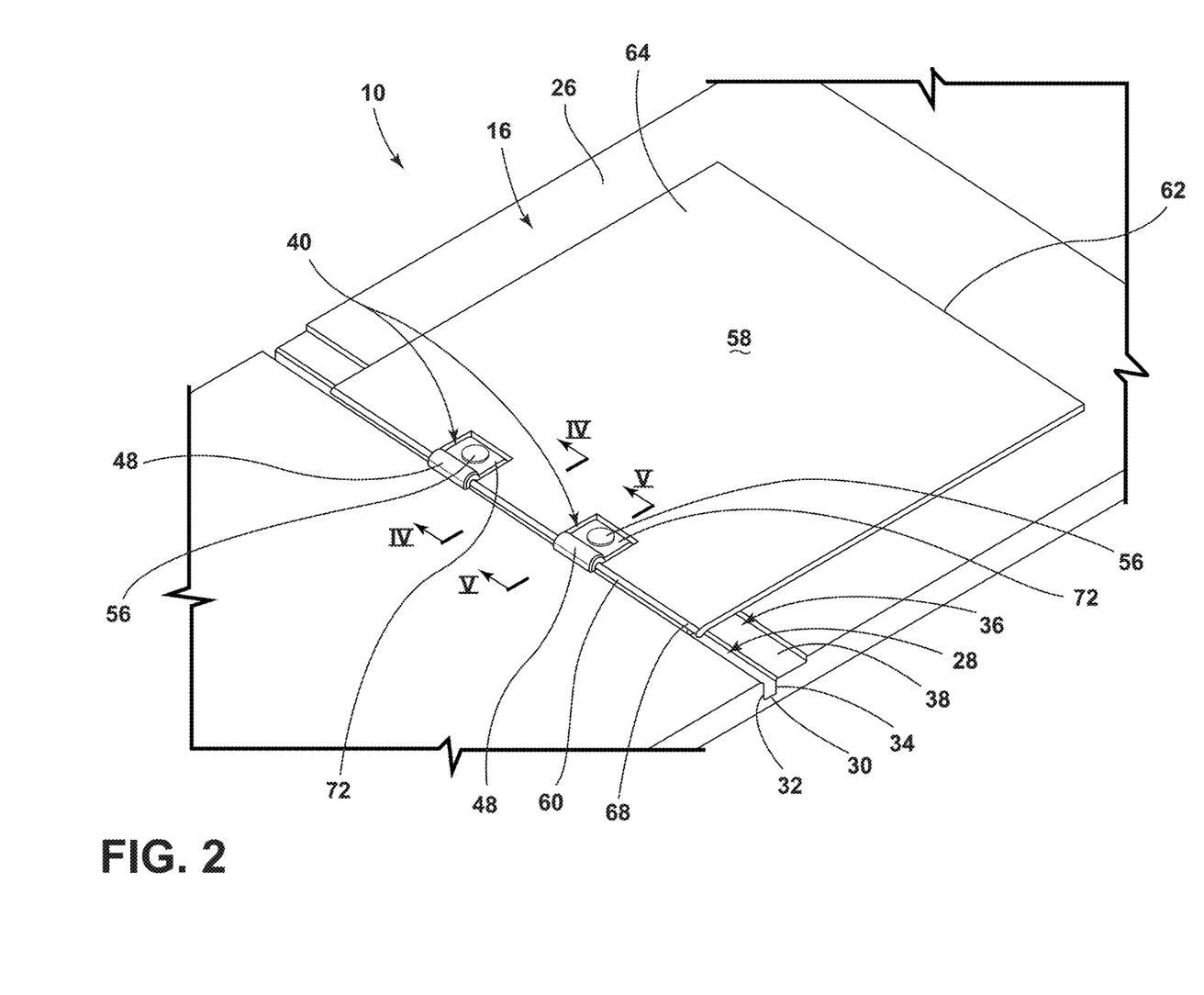
FIG. 2 is an upper perspective view of a substrate, a retention feature, and a panel, illustrating the panel in a stowed position, according to one embodiment.
Figure 3:
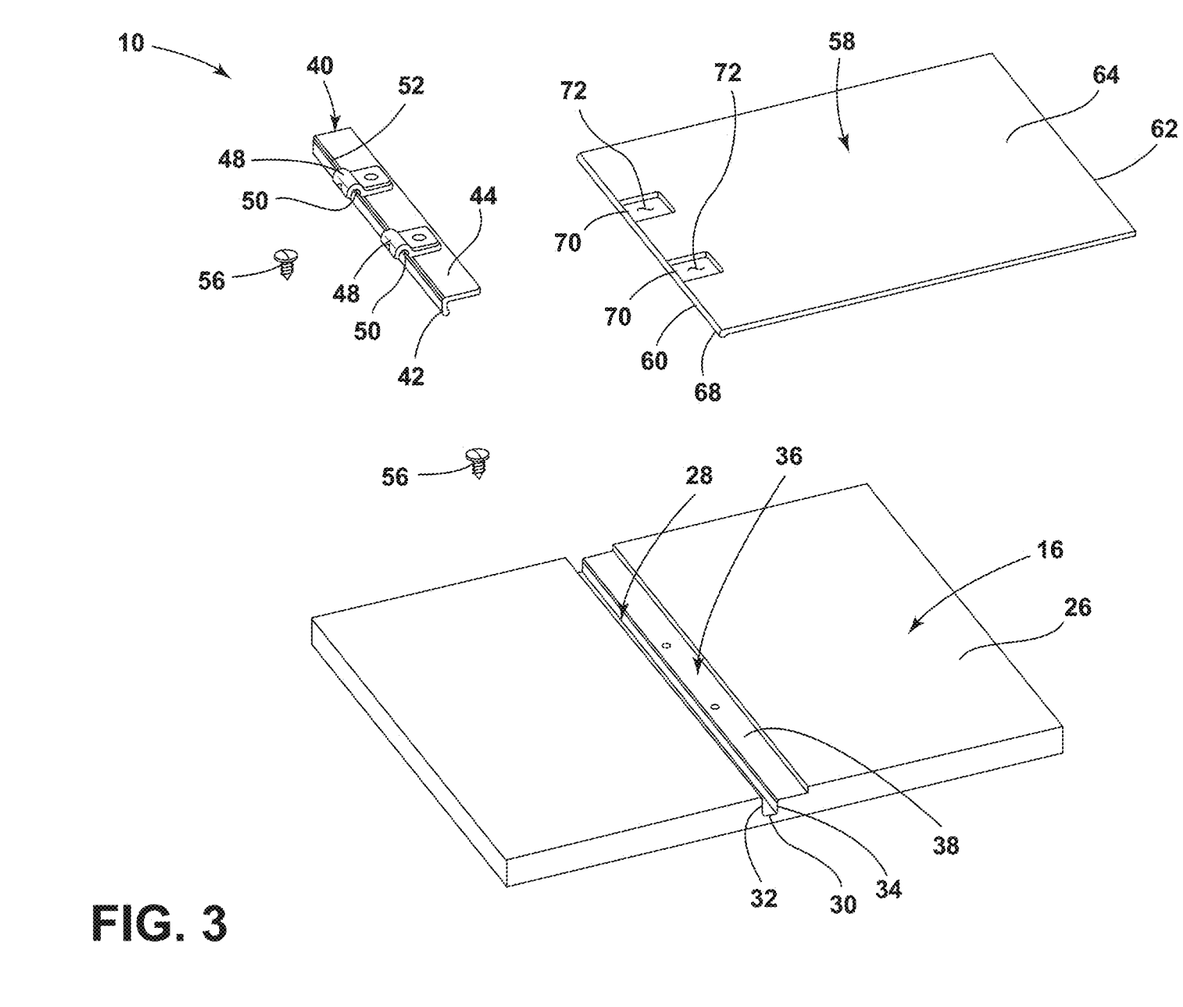
FIG. 3 is an exploded view of the assembly of FIG. 2, illustrating the substrate defining a channel, the retention feature, and the panel, according to one embodiment.
Figure 4:
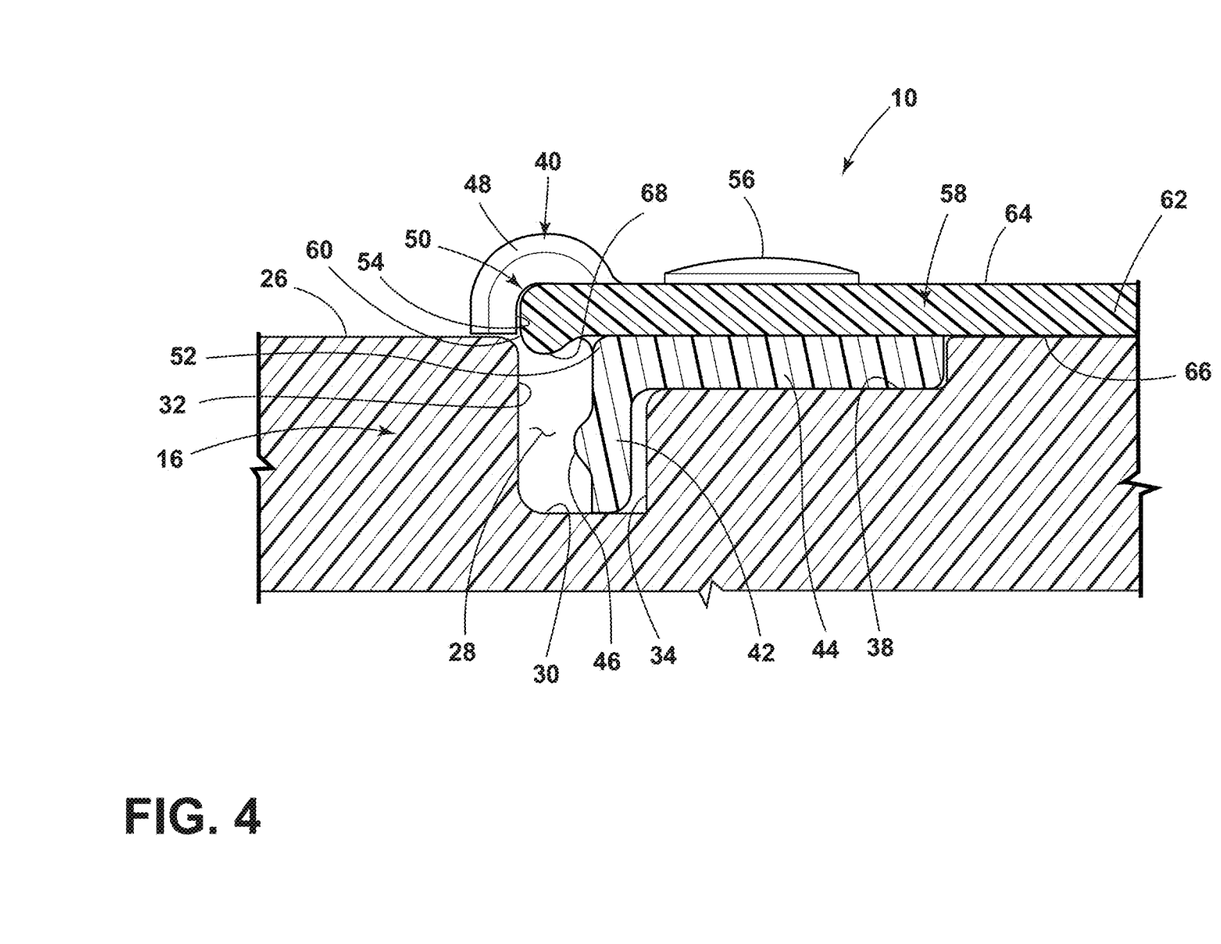
FIG. 4 is a cross-sectional view taken through a line IV-IV of FIG. 2, illustrating the panel in an unlocked position and pivoted to the stowed position, according to one embodiment.
Figure 5:
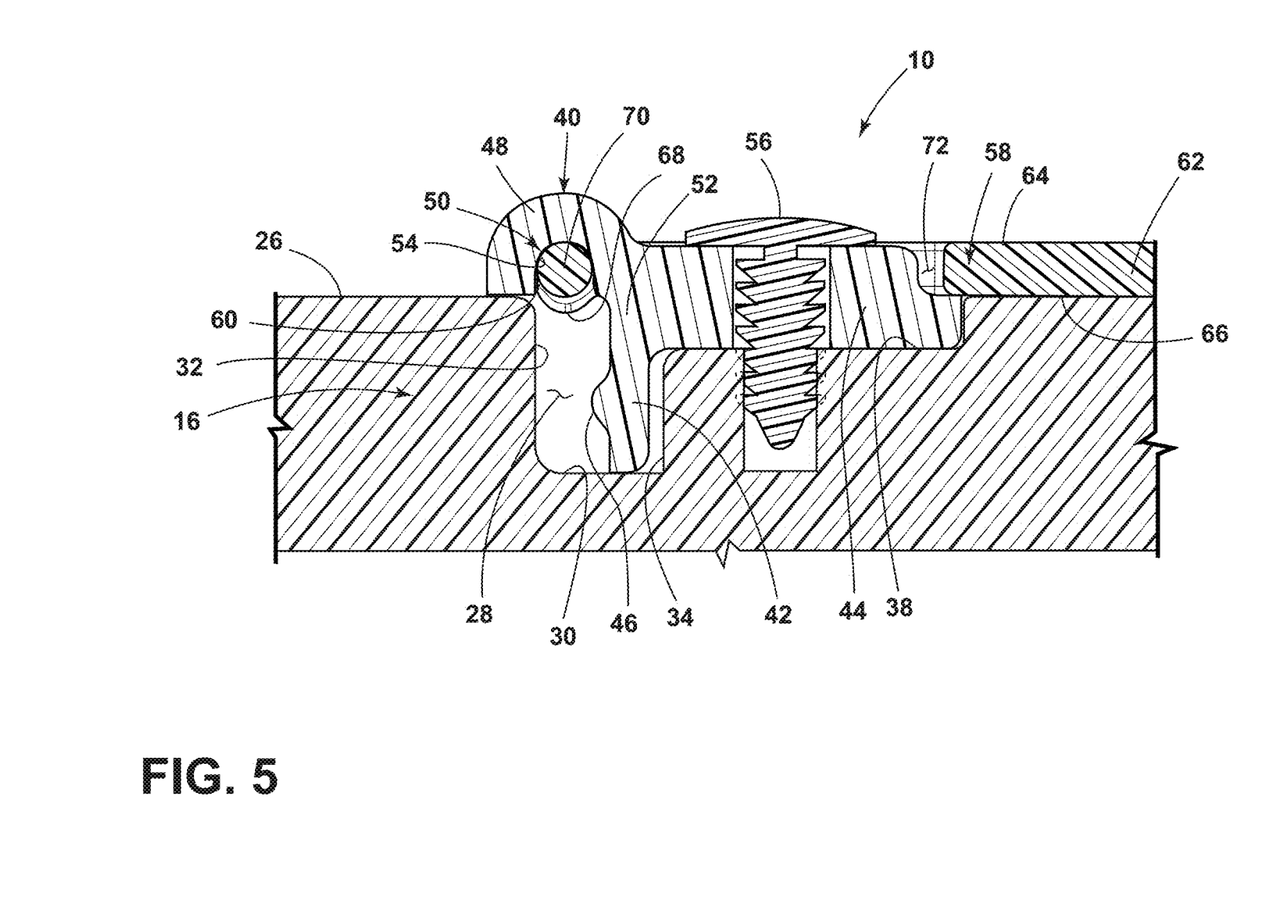
FIG. 5 is a cross-sectional view taken through line V-V of FIG. 2, illustrating the panel in the locked position and the stowed position, and a pivot portion of the panel received within a receiver defined by a receiving portion of the retention feature, according to one embodiment.

Referring now to FIGS. 1-5, the substrate 16 may include an upper surface 26. In some embodiments, the upper surface 26 may be substantially planar. Further, in some embodiments, the upper surface 26 of the substrate 16 may face vehicle-upward. As illustrated in FIG. 2, the substrate 16 defines the channel 28. The channel 28 may include a bottom 30. As illustrated in FIGS. 4 and 5, first and second side walls 32, 34 may extend upward from the bottom 30 to define the channel 28. In the illustrated embodiment, the first side wall 32 extends from the bottom 30 to the upper surface 26 of the substrate 16. The second side wall 34 extends upward from the bottom 30 opposite the first side wall 32. As illustrated in FIGS. 4 and 5, the substrate 16 defines a recess 36 that is adjacent to the channel 28 and that includes a recess floor 38. As illustrated, the second side wall 34 that defines the channel 28 extends from the bottom 30 to the recess floor 38 of the recess 36, and the recess floor 38 extends away from the channel 28. It is contemplated that, in some embodiments, the first side wall 32 and/or the second side wall 34 may extend from the bottom 30 to the upper surface 26 of the substrate 16. Further, in some embodiments, the substrate 16 may omit the recess 36 illustrated in FIGS. 4 and 5.

Referring still to FIGS. 1-5, the retention feature 40 may be coupled to the substrate 16. In various embodiments, the retention feature 40 may extend into the channel 28 defined by the substrate 16. For example, in some embodiments, the retention feature 40 may include a locking portion 42 that is positioned within the channel 28 defined by the substrate 16. In the embodiment illustrated in FIGS. 3-5, the retention feature 40 includes a support portion 44 that is coupled to the recess floor 38 of the substrate 16 that defines the recess 36, and a locking portion 42 that extends outward from the support portion 44 into the channel 28. As illustrated in FIGS. 4 and 5, the locking portion 42 extends outward from the support portion 44, such that the locking portion 42 and the support portion 44 form a generally L-shaped member.

Referring now to FIGS. 4 and 5, in some embodiments, the locking portion 42 may include a protrusion 46 that is positioned within the channel 28. The protrusion 46 may be in a spaced relationship with the bottom 30 of the channel 28. In other words, a distance may separate the bottom 30 of the channel 28 from the protrusion 46 of the locking portion 42. As illustrated in FIGS. 4 and 5, the protrusion 46 is in a spaced relationship with the bottom 30 of the channel 28 and extends outward from the side of the locking portion 42 that faces the first side wall 32 of the channel 28. In the depicted embodiment, the protrusion 46 has a generally rounded profile. As illustrated in FIGS. 4 and 5, the retention feature 40 may be coupled to the substrate 16 such that the side of the locking portion 42 opposite the protrusion 46 is in a spaced relationship with the second side wall 34 of the channel 28. As described further herein, the space between the second side wall 34 of the channel 28 and the locking portion 42 may allow the locking portion 42 to resiliently flex toward the second side wall 34 of the channel 28 as the panel 58 moves between the unlocked and locked positions.

Referring now to FIGS. 2-5, in various embodiments, the retention feature 40 may include a receiving portion 48. The receiving portion 48 may define a receiver 50. In various embodiments, the receiving portion 48 may be positioned outside of the channel 28 defined by the substrate 16. For example, in some embodiments, the receiving portion 48 may be positioned vehicle-upward of the channel 28. In the embodiment illustrated in FIGS. 4 and 5, the receiving portion 48 is an inverted U-shaped member that extends outward from the retention feature 40 proximate to an intersection 52 between the support portion 44 of the retention feature 40 and the locking portion 42 of the retention feature 40. As further illustrated in FIGS. 4 and 5, the receiver 50 is defined by an underside 54 of the receiving portion 48. The underside 54 of the receiving portion 48 may face vehicle-downward and may align with the channel 28 defined by the substrate 16. In the embodiment depicted in FIG. 5, the underside 54 of the receiving portion 48 that defines the receiver 50 is generally arcuate, such that a cylindrical or rounded member may be received therein. In the embodiments illustrated in FIGS. 2-5, fasteners 56 are employed to secure the retention feature 40 to the substrate 16. It is contemplated that the retention feature 40 may be coupled to the substrate 16 in a variety of manners (e.g., hook and loop fasteners, adhesives, magnets, etc.).

Referring now to FIGS. 1-8, in various embodiments, the panel 58 may be operably coupled to the retention feature 40. The panel 58 may extend from a proximal end 60 to a distal end 62. The panel 58 may include a first side 64 that extends from the proximal end 60 to the distal end 62 and a second side 66 that extends from the proximal end 60 to the distal end 62 opposite the first side 64. In various embodiments, the panel 58 may be operably coupled to the retention feature 40 proximate to the proximal end 60 of the panel 58.

Referring now to FIGS. 3-5, 7, and 8, the panel 58 may include a foot 68. The foot 68 may be positioned proximate to the proximal end 60 of the panel 58. In some embodiments, the foot 68 may be disposed on the second side 66 of the panel 58. In various embodiments, the foot 68 may protrude outward relative to the portions of the panel 58 that are adjacent to the foot 68. For example, as illustrated in FIG. 4, the foot 68 is disposed on the second side 66 of the panel 58 proximate to the proximal end 60 of the panel 58, and the foot 68 protrudes outward relative to the adjacent portion of the second side 66 of the panel 58 that is between the foot 68 and the distal end 62 of the panel 58. In the illustrated embodiment, the foot 68 slopes gradually to form a protuberance with a generally rounded profile.

Figure 8:
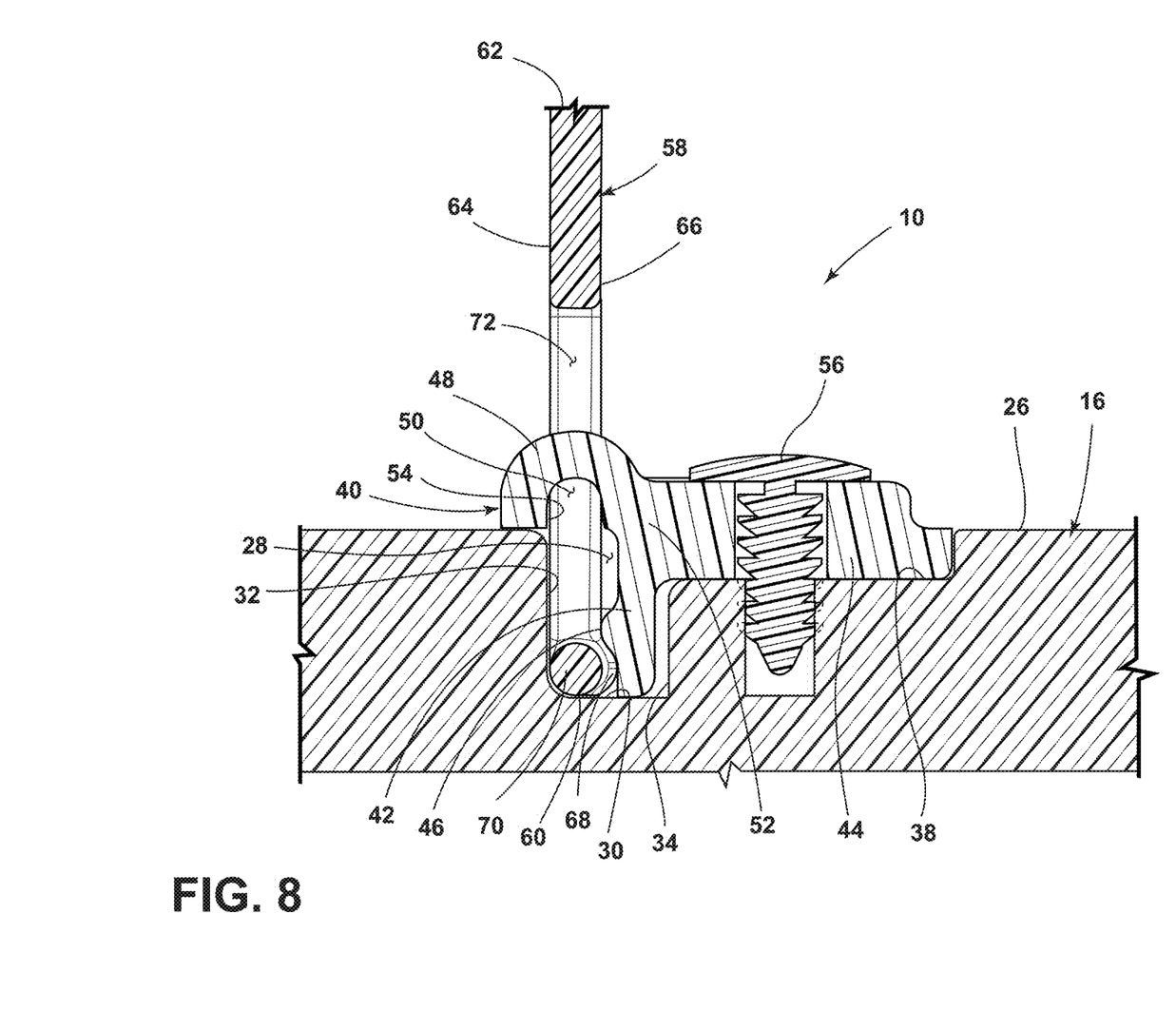
FIG. 8 is a cross-sectional view taken through line VIII-VIII of FIG. 6, illustrating the panel in the locked position and the upright position, according to one embodiment.
Figure 9:
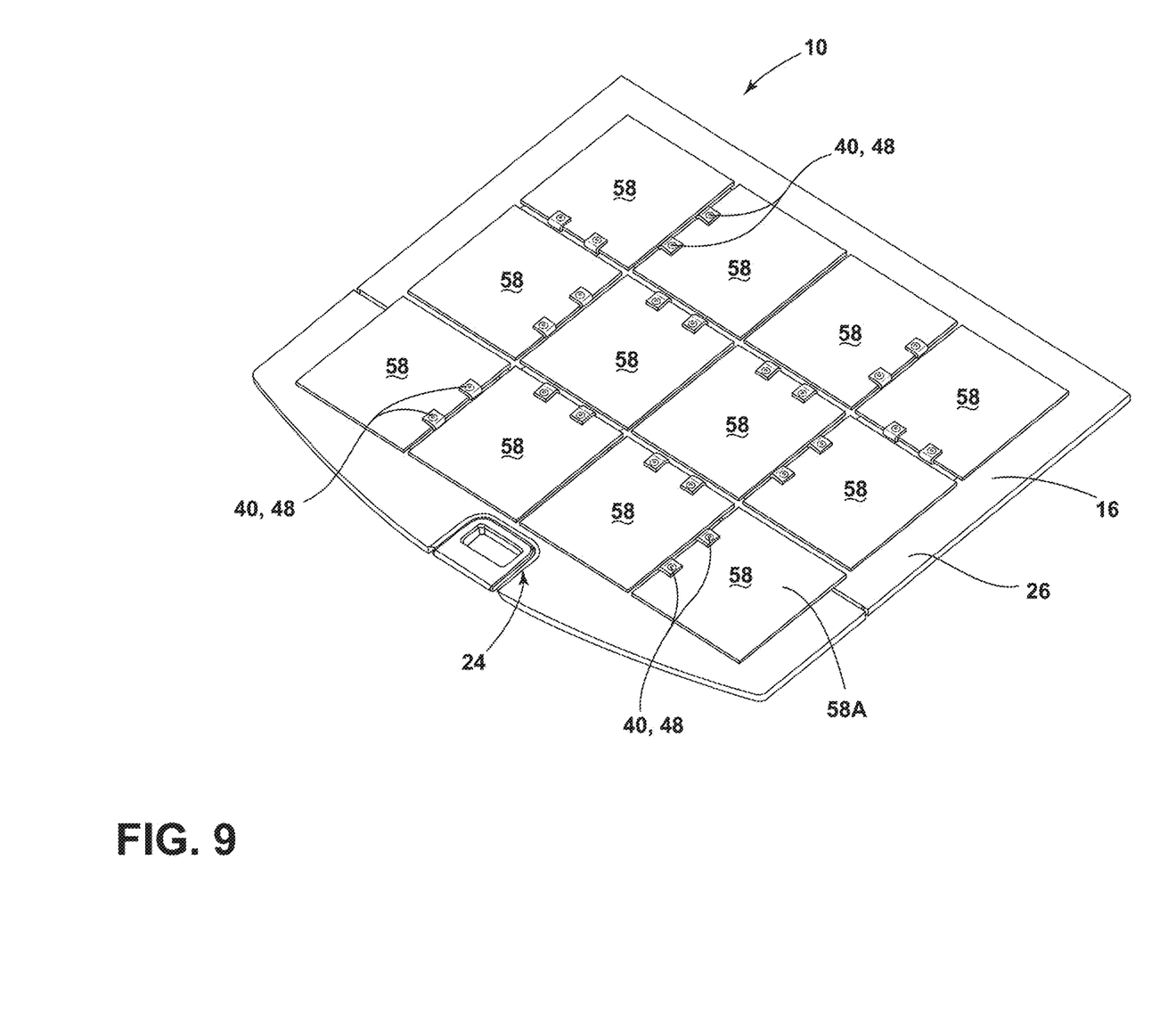
FIG. 9 is an upper perspective view of the substrate, a plurality of retention features, and a plurality of panels in stowed positions, according to one embodiment.

Referring now to FIGS. 3, 5, and 8, the panel 58 may include a pivot portion 70. The pivot portion 70 may be configured to be received within the receiver 50 defined by the receiving portion 48 of the retention feature 40. In various embodiments, the pivot portion 70 may be operable to rotate within the receiver 50 as the panel 58 pivots between the upright and stowed positions, as described further herein. In some embodiments, the pivot portion 70 may be disposed proximate to the proximal end 60 of the panel 58. In some embodiments, the pivot portion 70 may be positioned adjacent to the foot 68 of the panel 58. As illustrated in FIGS. 5 and 8, the pivot portion 70 has a circular profile and is positioned adjacent to the foot 68 of the panel 58, which protrudes outward further than the pivot portion 70. In various embodiments, the pivot portion 70 may be substantially cylindrical, which may aid the pivot portion 70 in rotating within the receiver 50 defined by the receiving portion 48 of the retention feature 40.

Figure 6:
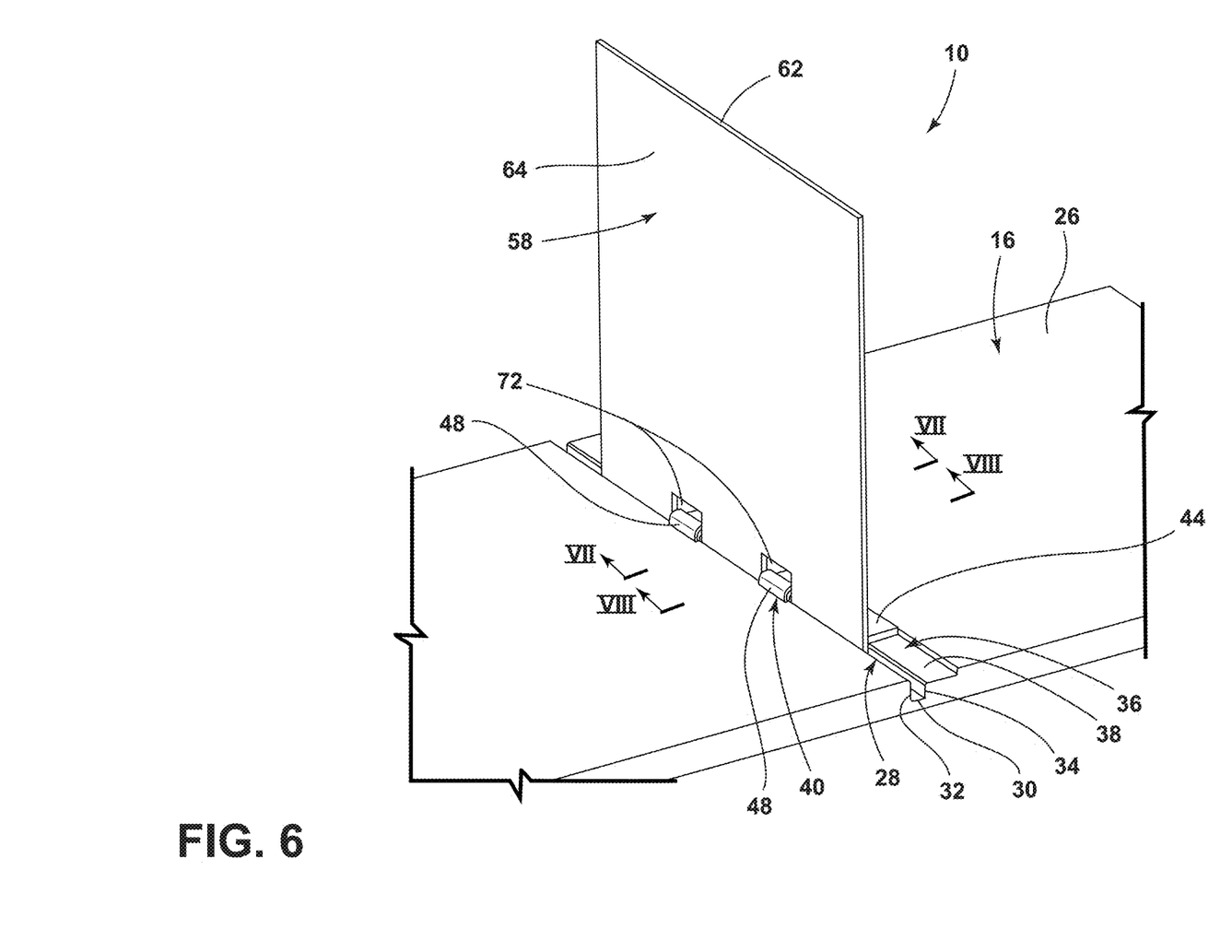
FIG. 6 is an upper perspective view of the substrate, the panel, and the retention feature, illustrating the panel in a locked position and the upright position, according to one embodiment.

Referring now to FIGS. 2, 3, 5, 6, and 8, in various embodiments, an aperture 72 may extend through the panel 58 adjacent to the pivot portion 70 of the panel 58. For example, as illustrated in FIG. 3, the pivot portion 70 is adjacent to the aperture 72, which extends through the panel 58 between the pivot portion 70 and the distal end 62 of the panel 58. The receiving portion 48 of the retention feature 40 may extend through the aperture 72 defined by the panel 58, as illustrated in FIG. 6, and the pivot portion 70 of the panel 58 may be received within the receiver 50 defined by the underside 54 of the receiving portion 48, as illustrated in FIG. 5. As such, the panel 58 may be operably coupled to the retention feature 40 and pivotable between the upright and stowed positions relative to the retention feature 40. As illustrated in FIG. 3, in various embodiments, the retention feature 40 may include a plurality of receiving portions 48, and the panel 58 may include a plurality of apertures 72 and/or pivot portions 70 that corresponds to the plurality of receiving portions 48.

Figure 7:
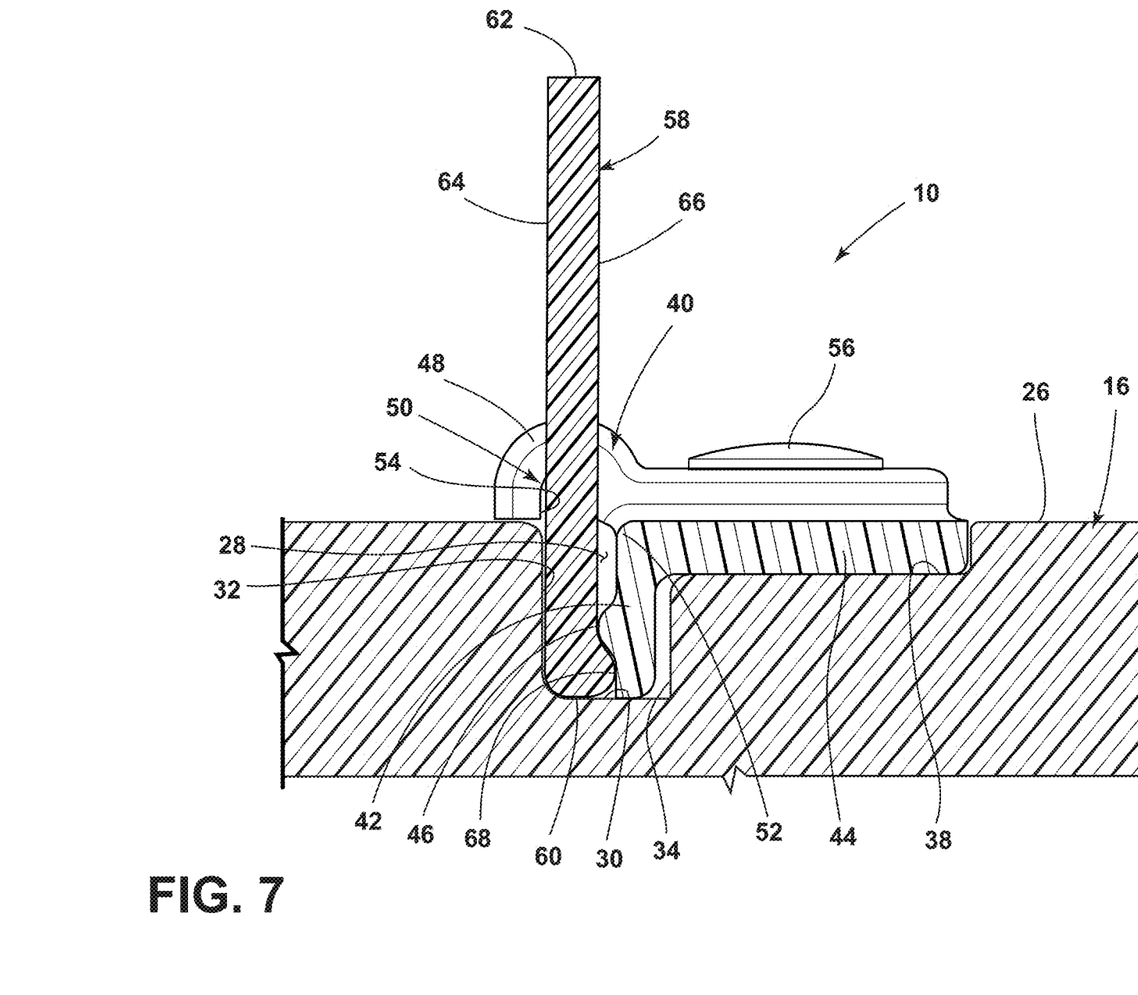
FIG. 7 is a cross-sectional view taken through line VII-VII of FIG. 6, illustrating the panel in the upright position and the locked position, according to one embodiment.

Referring now to FIGS. 2 and 4-8, the panel 58 is operable between a locked position and an unlocked position. In the locked position, the panel 58 may be maintained in the upright position by the retention feature 40. As illustrated in FIGS. 7 and 8, the foot 68 is nearer than the protrusion 46 to the bottom 30 in the locked position of the panel 58. As illustrated in FIG. 8, the pivot portion 70 is nearer than the protrusion 46 to the bottom 30 in the locked position of the panel 58. In various embodiments, the locking portion 42 of the retention feature 40 may be engaged with the foot 68 of the panel 58 within the channel 28 to maintain the panel 58 in the upright position. As illustrated in FIG. 7, a portion of the first side 64 of the panel 58 contacts the first side wall 32 that defines the channel 28, the proximal end 60 of the panel 58 contacts the bottom 30 of the channel 28, the foot 68 of the panel 58 contacts the protrusion 46 of the locking portion 42 of the retention feature 40 and part of the locking portion 42 between the protrusion 46 and the bottom 30 of the channel 28, and a portion of the panel 58 between the foot 68 and the distal end 62 contacts the protrusion 46 of the locking portion 42. The different portions of the substrate 16 and the retention feature 40 contacting the panel 58 in this way, while the panel 58 is in the locked position, maintains the panel 58 in the upright position, as illustrated in FIGS. 6-8.

Referring further to FIGS. 2 and 4-8, in the unlocked position of the panel 58, the foot 68 is further than the protrusion 46 from the bottom 30 of the channel 28. Further, in various embodiments, the pivot portion 70 is further than the protrusion 46 from the bottom 30 in the unlocked position of the panel 58. As illustrated in FIGS. 4 and 5, in various embodiments, the pivot portion 70 may be received within the receiver 50 defined by the underside 54 of the receiving portion 48 in the unlocked position of the panel 58. In various embodiments, the panel 58 may be operable to pivot between the stowed position, illustrated in FIGS. 4 and 5, and the upright position via rotation of the pivot portion 70 of the panel 58 within the receiver 50 defined by the receiving portion 48 of the retention feature 40.

In some embodiments, when the panel 58 is in the unlocked position and the upright position, the panel 58 may be operable to move toward and away from the bottom 30 of the channel 28, such that the pivot portion 70 of the panel 58 is moved out of and into the receiver 50 defined by the receiving portion 48 of the retention feature 40. In the upright and unlocked position of the panel 58, the pivot portion 70 may be moved out of the receiver 50 toward the bottom 30 of the channel 28. Moving the panel 58 downward in this way causes the foot 68 of the panel 58 to interfere with the protrusion 46 of the locking portion 42 of the retention feature 40, which inhibits the panel 58 from entering the locked position. Application of sufficient downward force to the panel 58, when the panel 58 is in the upright position, prompts the locking portion 42 of the retention feature 40 to flex toward the second side wall 34 that defines the channel 28 due to the contact between the contoured surfaces of the protrusion 46 and the foot 68. In operation, the locking portion 42 flexes far enough toward the second side wall 34 that the foot 68 of the panel 58 is able to slide past the protrusion 46 to the bottom 30 of the channel 28. Once the foot 68 clears the protrusion 46, the locking portion 42 of the retention feature 40 resiliently rebounds back toward an at rest position and engages the panel 58 between the foot 68 and the distal end 62 of the panel 58. In this way, the panel 58 moves from the unlocked position to the locked position, as illustrated in FIGS. 7 and 8.

Referring now to FIGS. 2 and 4-8, the portion of the second side 66 of the panel 58 that extends between the foot 68 and the distal end 62 may be substantially parallel to the first side 64 of the panel 58. As illustrated in FIGS. 2, 4, and 5, the first side 64 of the panel 58 may be substantially parallel to the upper surface 26 of the substrate 16 in the stowed position of the panel 58. In some embodiments, the portion of the second side 66 of the panel 58 between the foot 68 and the distal end 62 may be substantially parallel to the upper surface 26 of the substrate 16 in the stowed position of the panel 58. In various embodiments, the second side 66 of the panel 58 may be configured to contact the upper surface 26 of the substrate 16 in the stowed position of the panel 58, as illustrated in FIGS. 4 and 5. As illustrated in FIGS. 6-8, in some embodiments, the first side 64 of the panel 58 may be substantially perpendicular to the upper surface 26 of the substrate 16 in the upright position of the panel 58. In some embodiments, the portion of the second side 66 of the panel 58 between the foot 68 and the distal end 62 may be substantially perpendicular to the upper surface 26 of the substrate 16 in the upright position of the panel 58.

Referring now to FIGS. 9-12, in various embodiments, the vehicle 12 may include a plurality of panels 58 that are coupled to at least one retention feature 40 that extends into at least one channel 28 defined by the substrate 16. In some implementations, the vehicle 12 may include a plurality of panels 58, a plurality of retention features 40, and/or a plurality of channels 28 defined by the substrate 16. In an exemplary embodiment, a first panel 58A is operably coupled to at least one retention feature 40 and is movable between a first panel locked position, wherein the first panel 58A is maintained in a first panel upright position by the at least one retention feature 40, and a first panel unlocked position, wherein the first panel 58A is operable to pivot relative to the at least one retention feature 40 between the first panel upright position and a first panel stowed position. A second panel 58B is operably coupled to the at least one retention feature 40 and is movable between a second panel locked position, wherein the second panel 58B is maintained in a second panel upright position by the at least one retention feature 40, and a second panel unlocked position, wherein the second panel 58B is operable to pivot relative to the at least one retention feature 40 between the second panel upright position and a second panel stowed position.

In some embodiments, the first panel 58A may be operable to pivot about a first pivot axis 74 between the first panel upright position and the first panel stowed position, and the second panel 58B may be operable to pivot about a second pivot axis 76 between the second panel upright position and the second panel stowed position. In some embodiments, the first pivot axis 74 may be substantially perpendicular to the second pivot axis 76. In some embodiments, the first pivot axis 74 may be substantially parallel to the second pivot axis 76.

Figure 10:
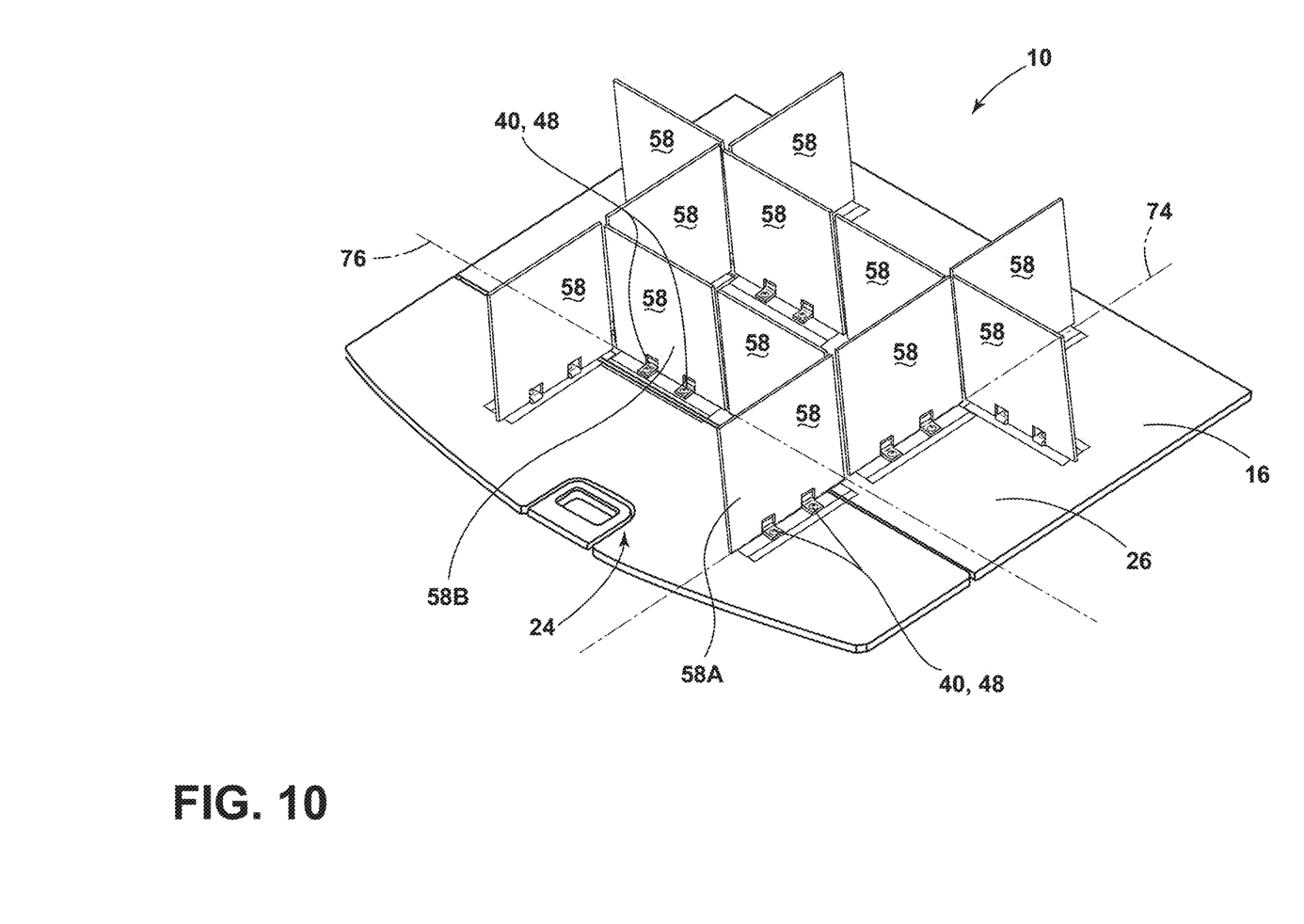
FIG. 10 is an upper perspective view of the substrate, a plurality of retention features, and a plurality of panels, illustrating the plurality of panels in upright positions, according to one embodiment.
Figure 11:
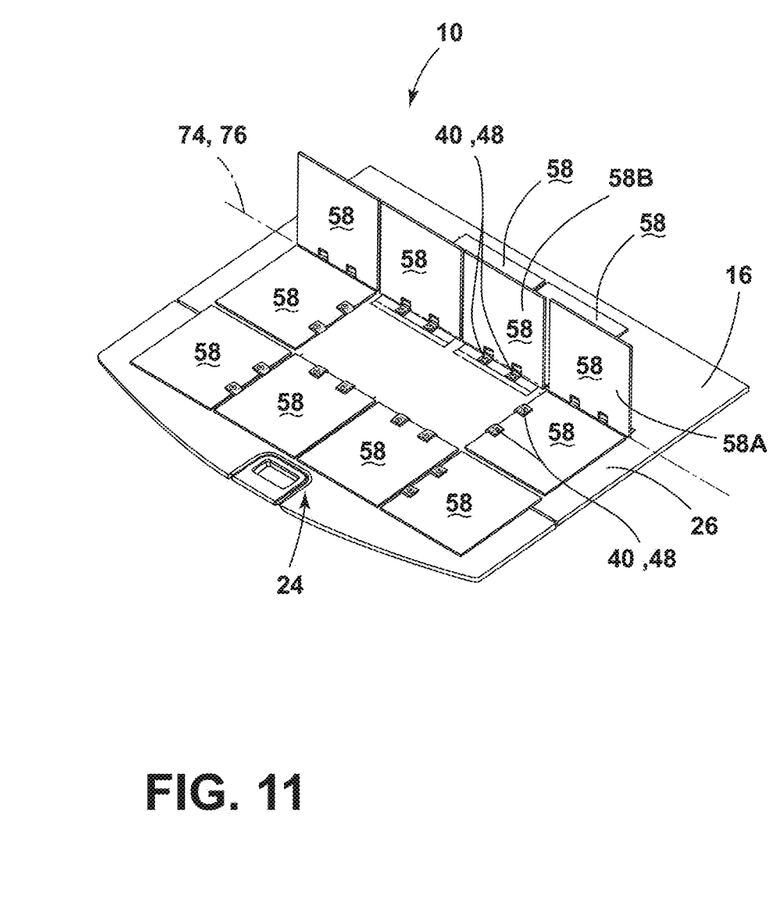
FIG. 11 is an upper perspective view of the substrate, a plurality of retention features, and a plurality of panels, illustrating some of the plurality of panels in upright positions and some of the plurality of panels in stowed positions, according to one embodiment.
Figure 12:
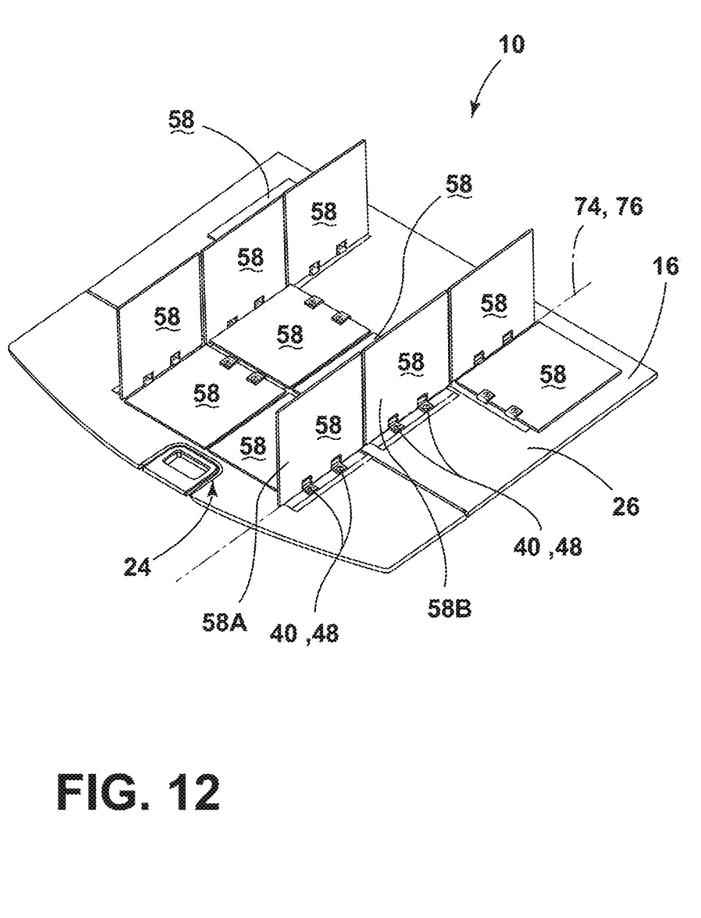
FIG. 12 is an upper perspective view of the substrate, a plurality of retention features, and a plurality of panels, illustrating some of the plurality of panels in stowed positions and some of the plurality of panels in upright positions, according to one embodiment.

In operation of the plurality of panels 58 within the vehicle 12, the plurality of panels 58 may initially be in stowed positions, wherein the panels 58 lie flat against the substrate 16, as illustrated in FIG. 1. Next, a user pivots some of the plurality of panels 58 from the stowed positions to upright positions to divide the rear cargo area 20 of the vehicle 12 into subsections, as illustrated in FIGS. 11 and 12. After moving the upright panels 58 from unlocked positions to locked positions, the user is able to store items within the subsections defined by the upright, locked panels 58. Upon desiring to stow the upright panels 58, the user may move the upright panels 58 back from the locked positions to the unlocked positions and pivot the panels 58 from the upright positions to the stowed positions, such that the panels 58 lie flat against the substrate 16 within the rear cargo area 20 of the vehicle 12, as illustrated in FIG. 1. In some examples, the user may pivot each of the panels 58 to the upright and locked positions, as illustrated in FIG. 10, to further divide the rear cargo area 20 of the vehicle 12.

The present disclosure may provide a variety of advantages. First, the retention feature 40 may provide a structure for the panel 58 to pivot relative to between the stowed and upright positions, and the retention feature 40 may also allow the panel 58 to be locked in the upright position. Second, the vehicle 12 having a plurality of individually pivotable and lockable panels 58 may enable a user to customize how the rear cargo area 20 of the vehicle 12 is divided into subsections based on which of the panels 58 are in the upright and locked positions and which of the panels 58 are in the stowed positions.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An assembly for a vehicle, comprising:
a substrate that defines a channel having a bottom;
a retention feature coupled to the substrate and extending into the channel; and
a panel operably coupled to the retention feature and movable between a locked position, wherein the panel is maintained in an upright position by the retention feature, and an unlocked position, wherein the panel is operable to pivot relative to the retention feature between the upright position and a stowed position.

2. The assembly of claim 1, wherein the retention feature includes a locking portion positioned within the channel and having a protrusion and a receiving portion positioned outside of the channel and defining a receiver, wherein the panel is maintained in the upright position by the locking portion.

3. The assembly of claim 2, wherein the panel includes a foot, and wherein the foot is nearer than the protrusion to the bottom in the locked position, and the foot is further than the protrusion from the bottom in the unlocked position.

4. The assembly of claim 2, wherein the panel includes a pivot portion configured to be received within the receiver in the unlocked position, such that the panel is operable to pivot between the upright and stowed positions via rotation of the pivot portion within the receiver.

5. The assembly of claim 4, wherein the pivot portion is nearer than the protrusion to the bottom in the locked position, and the pivot portion is further than the protrusion from the bottom in the unlocked position.

6. The assembly of claim 1, wherein the substrate includes an upper surface, and the panel includes a first side and a second side opposite the first side, and wherein the first side is substantially parallel to the upper surface in the stowed position of the panel, and the first side is substantially perpendicular to the upper surface in the upright position of the panel.

7. The assembly of claim 6, wherein the second side is configured to contact the upper surface in the stowed position of the panel.

8. A vehicle, comprising:
a rear cargo area;
a substrate positioned within the rear cargo area and defining a channel having a bottom;
a retention feature having a locking portion positioned within the channel and a receiving portion positioned outside the channel and defining a receiver; and
a panel having a pivot portion and a foot and being operable between a locked position, wherein the locking portion is engaged with the foot within the channel to maintain the panel in an upright position, and an unlocked position, wherein the panel is operable to pivot between the upright position and a stowed position via rotation of the pivot portion within the receiver.

9. The vehicle of claim 8, wherein the locking portion includes a protrusion within the channel and in a spaced relationship with the bottom.

10. The vehicle of claim 9, wherein the foot is nearer than the protrusion to the bottom in the locked position, and the foot is further than the protrusion from the bottom in the unlocked position.

11. The vehicle of claim 10, wherein the pivot portion is nearer than the protrusion to the bottom in the locked position, and the pivot portion is further than the protrusion from the bottom in the unlocked position.

12. The vehicle of claim 8, wherein the substrate includes an upper surface, and the panel includes a first side and a second side opposite the first side, and wherein the first side is substantially parallel to the upper surface in the stowed position of the panel, and the first side is substantially perpendicular to the upper surface in the upright position of the panel.

13. The vehicle of claim 12, wherein the second side is configured to contact the upper surface in the stowed position of the panel.

14. The vehicle of claim 12, wherein the upper surface is substantially planar and faces vehicle-upward.

15. An assembly for a vehicle, comprising:
a substrate defining at least one channel having a bottom;
at least one retention feature coupled to the substrate and extending into the at least one channel;
a first panel operably coupled to the at least one retention feature and movable between a first panel locked position, wherein the first panel is maintained in a first panel upright position by the at least one retention feature, and a first panel unlocked position, wherein the first panel is operable to pivot relative to the at least one retention feature between the first panel upright position and a first panel stowed position; and a second panel operably coupled to the at least one retention feature and movable between a second panel locked position, wherein the second panel is maintained in a second panel upright position by the at least one retention feature, and a second panel unlocked position, wherein the second panel is operable to pivot relative to the at least one retention feature between the second panel upright position and a second panel stowed position.

16. The assembly of claim 15, wherein the first panel is operable to pivot about a first pivot axis between the first panel upright position and the first panel stowed position, and the second panel is operable to pivot about a second pivot axis between the second panel upright position and the second panel stowed position, wherein the first pivot axis is substantially perpendicular to the second pivot axis.

17. The assembly of claim 15, wherein the first panel is operable to pivot about a first pivot axis between the first panel upright position and the first panel stowed position, and the second panel is operable to pivot about a second pivot axis between the second panel upright position and the second panel stowed position, wherein the first pivot axis is substantially parallel to the second pivot axis.

18. The assembly of claim 15, wherein the at least one retention feature includes a locking portion positioned within the at least one channel and having a protrusion and a receiving portion positioned outside of the at least one channel and defining a receiver, wherein the first panel is maintained in the first panel upright position by the locking portion.

19. The assembly of claim 18, wherein the first panel includes a foot, and wherein the foot is nearer than the protrusion to the bottom in the first panel locked position, and the foot is further than the protrusion from the bottom in the first panel unlocked position.

20. The assembly of claim 18, wherein the first panel includes a pivot portion configured to be received within the receiver in the first panel unlocked position, such that the first panel is operable to pivot between the first panel upright position and the first panel stowed position via rotation of the pivot portion within the receiver.

* * * * *